United States Patent [19]
Bradford et al.

[11] Patent Number: 5,904,798
[45] Date of Patent: May 18, 1999

[54] METHOD OF PARENT WELDING PARTITION MATRIX

[75] Inventors: Judson A. Bradford, Holland; Brian E. Bouwens, Hudsonville, both of Mich.

[73] Assignee: Bradford Company, Holland, Mich.

[21] Appl. No.: 08/891,746

[22] Filed: Jul. 14, 1997

Related U.S. Application Data

[60] Division of application No. 08/713,988, Sep. 13, 1996, Pat. No. 5,788,146, which is a continuation-in-part of application No. 08/600,589, Feb. 13, 1996, Pat. No. 5,732,876.

[51] Int. Cl.⁶ .................................................. B32B 31/20
[52] U.S. Cl. ................................... 156/309.6; 156/273.7; 156/309.9; 220/507; 229/120.07; 249/203; 428/36.1; 493/966
[58] Field of Search .............................. 156/309.6, 273.7, 156/309.9; 249/203; 493/966; 229/120.07; 220/507; 428/36.1

[56] References Cited

U.S. PATENT DOCUMENTS

| | | |
|---|---|---|
| 1,912,505 | 6/1933 | Weston . |
| 2,145,106 | 1/1939 | Anderson . |
| 2,232,632 | 2/1941 | Reynolds . |
| 2,549,801 | 4/1951 | George . |
| 2,736,483 | 2/1956 | Moore . |
| 2,842,279 | 7/1958 | Gustafson . |
| 3,019,147 | 1/1962 | Nalle ...................................... 428/36.1 |
| 3,067,903 | 12/1962 | Jones, Jr. . |
| 3,075,868 | 1/1963 | Long ......................................... 156/82 |
| 3,253,763 | 5/1966 | Henderson . |
| 3,340,341 | 9/1967 | Bruder ..................................... 264/248 |
| 3,383,027 | 5/1968 | Brinkama et al. . |
| 3,580,471 | 5/1971 | Burke . |
| 3,640,445 | 2/1972 | Durham . |
| 3,843,039 | 10/1974 | Brown et al. . |
| 3,942,709 | 3/1976 | Gepfer . |
| 4,226,357 | 10/1980 | Martin . |
| 4,621,764 | 11/1986 | Ragon . |
| 4,746,053 | 5/1988 | Nichols . |
| 4,776,481 | 10/1988 | Kidd . |
| 4,917,934 | 4/1990 | Sempolinski . |
| 4,978,408 | 12/1990 | Burford et al. ....................... 156/309.9 |
| 5,487,930 | 1/1996 | Lockshaw et al. . |
| 5,597,113 | 1/1997 | Bradford . |

FOREIGN PATENT DOCUMENTS

| | | |
|---|---|---|
| 2424873 | 12/1975 | Germany . |
| 1066615 | 4/1967 | United Kingdom . |

OTHER PUBLICATIONS

The Wiley of Encyclopedia of Packaging Technology, Marilyn Bakker, David Eckroth; John Wiley & Sons, 1986; pp. 226–227.

Primary Examiner—John J. Gallagher
Attorney, Agent, or Firm—Wood, Herron & Evans, L.L.P.

[57] ABSTRACT

A nondisassembling partition assembly comprising a partition matrix made up of intersecting first and second slotted plastic partitions, each of the partitions having at least one slot. The slots of the partitions are engaged with each other at a plurality of intersections. The matrix is held together in a nondisassembling relationship by at least one parent weld formed by heating an edge of the partitions at one or more intersections with one or more heat sources until the intersecting partitions become molten, removing the heat source or sources from edge of the intersecting partitions and allowing the partitions to cool. The parent welds formed by this process permanently secure the partitions together in the nondisassembling relationship without the use of any material other than the partitions themselves. A supporting net may be permanently secured to one edge of the partition matrix by either placing the net in contact with heated edges of the partitions while the edges of the partitions are molten and then allowing the edges of the partitions to cool, or by placing both the net and the edge of the matrix proximate a heat source to melt both and then when molten, distancing both from the heat source and allowing both to cool.

14 Claims, 4 Drawing Sheets

METHOD OF PARENT WELDING PARTITION MATRIX

CROSS-REFERENCE TO RELATED APPLICATION

This application is a divisional application of patent application Ser. No. 08/713,988, filed Sep. 13, 1996, now U.S. Pat. No. 5,788,146, which was a Continuation-In-Part application of U.S. application Ser. No. 08/600,589 filed Feb. 13, 1996 entitled Welded Partition Assembly (now U.S. Pat. No. 5,732,876) and assigned to the assignee of this application, which application is herein incorporated by reference in its entirety. The application which matured into U.S. Pat. No. 5,732,876 was a Continuation-In-Part application of Ser. No. 08/559,619 filed Nov. 20, 1995 entitled Recyclable Container Partition, (now U.S. Pat No. 5,597,113) which is also herein being incorporated by reference in its entirety.

FIELD OF THE INVENTION

The present invention relates to a nondisassembling partition assembly for dividing the space inside a container or box; more particularly to a nondisassembling partition assembly made of slotted plastic partitions.

DESCRIPTION OF THE PRIOR ART

In the storage, shipment or display of parts or merchandise, it is a common practice to divide the interior of a box or container into a plurality of individual cells. The interior of a box or container is typically separated by a series of dividers, one set of parallel dividers being orthogonal to a second set of dividers. The dividers separate the interior of the container into a plurality of individual holding cells each of which is intended to hold a separate item for display or shipment. The division of the interior of the box or container helps prevent the items therein from contacting one another and breaking during shipping. The division or partitioning of the container also aids in the loading and unloading of the items therein, as well as inventorying the contents of each box or container.

The dividers typically are slotted and arranged in an orthogonal relationship to divide the interior of the box or container into a desired number of holding cells. The dividers are slotted in a manner that enables the dividers to engage with one another at the location of the slots so that the dividers form an orthogonal grid or matrix. Typically the dividers are made of the same material as the material of the box or container, plastic or paperboard. However, the dividers may be constructed of any suitable material with sufficient rigidity to prevent the contents of the container from contacting one another and being damaged.

Disassembling traditional partition assemblies comprise a series of individual slotted dividers which mesh together in an orthogonal grid or matrix. The assembly as a whole is generally collapsible but the individual dividers of the assembly may be removed from the assembly individually and stacked. To disassemble the array or matrix of dividers one must lift one of the slotted dividers up out of the box or container, disengaging its slots with the slots of the dividers orthogonal to it. Because the assembly is disassembling, the assembly may be stored in much less space than if the assembly were nondisassembling. A problem with this type of partition assembly, though, is that if one desires to re-use the assembly one has to re-engage the slots of the dividers and then place the assembly inside a box or container. Additionally, this type of partition assembly is subject to inadvertent disassembly whenever parts are removed from the cells of the partition assembly.

A more desirable partition assembly for many applications is one that is not fully disassembling with the individual dividers of the assembly affixed to each other. Such a nondisassembling assembly may be lifted as a whole out of a box without the operator worrying about the dividers separating from one another.

Several U.S. patents disclose nondisassembling, collapsible partition assemblies which separate the interior of a box or container into a plurality of cells. The collapsible divider assemblies disclosed in these patents generally have a first set of dividers extending in one direction intersecting orthogonally with a second set of dividers extending in a second direction. In many of these nondisassembling assemblies, a portion of either the longitudinal or transverse divider is cut out at each intersection and permanently affixed to the adjacent intersecting divider in order to make the assembly nondisassembling. In others of these nondisassembling assemblies, a flap added to either the longitudinal or transverse dividers is folded and permanently affixed to the intersecting divider.

One such nondisassembling partition assembly is disclosed in U.S. Pat. No. 4,621,764 wherein slotted cross strips of a collapsible partition assembly intersect and are joined to slotted longitudinal dividers. According to the disclosure of this patent, each of the cross strips has tabs cut from the center section of each cross strip adjacent the intersecting longitudinal divider, the tabs being folded into contact with and adhered to the longitudinal dividers to prevent the longitudinal dividers from separating from the cross strips.

Another nondisassembling slotted partition assembly is disclosed in U.S. Pat. No. 4,746,053. In this patent there is disclosed a nondisassembling partition assembly having a plurality of longitudinal slotted dividers inter-engaging a plurality of slotted transverse dividers. Triangular shaped tabs are cut and folded from the longitudinal dividers adjacent the top of each slot of the divider. These tabs are spot welded, stapled or otherwise secured to the transverse dividers to prevent the partition assembly from ever disassembling.

U.S. Pat. No. 3,942,709 discloses a slotted partition assembly having a plurality of parallel longitudinal dividers intersecting a plurality of cross dividers or so called tying strips. The end portions of the tying strips are bent along score lines and secured to the longitudinal dividers by a glue bond so as to prevent disassembly of the assembled partition assembly.

In each of these prior art patents, the longitudinal dividers are secured to the transverse dividers at specific locations only, namely those locations in which a portion of a divider has been cut or scored and folded along a perforation. The folded portion is then spot welded, glued or otherwise secured to the adjacent intersecting partition or divider. Such attachment or securement using tabs or folded portions of the dividers glued or otherwise secured to adjacent intersecting dividers is not always secure and may result in the tearing of the tabs and hence disassembly of the matrix. This method of securing the intersecting dividers is also costly due to the cost of cutting the tabs, assembling the partitions, folding the tabs and adhering or otherwise securing the tabs and adjacent partitions.

In each of these prior art patents, at the specific locations where the longitudinal dividers are secured to the transverse dividers some sort of additional material is generally required to secure the dividers together. This additional material may be staples, glue, or additional plastic material used to secure one portion of a divider to an intersecting divider. This additional material used to secure intersecting dividers adds to the cost of manufacture of the assembly and may increase the time required for manufacture.

It therefore has been one objective of the present invention to provide a method of manufacturing a non-disassembling partition assembly without the use of any additional material other than the material of the partitions themselves.

It has been another objective of the present invention to provide a method of manufacturing a non-disassemblable partition assembly which is less costly than all heretofore known methods.

It has been a further objective of the invention to provide a method of manufacturing a non-disassemblable partition assembly which is secure and may not be easily disassembled.

It has been another objective of the present invention to provide a durable, sturdy, non-disassemblable partition assembly which is less costly to produce than prior disassemblable partition assemblies.

It has been another objective of the present invention to provide a less costly, nondisassemblable collapsible partition assembly in which the partitions are made of plastic and are recyclable.

SUMMARY OF THE INVENTION

The nondisassembling partition assembly of the present invention which accomplishes these objectives comprises at least one first slotted partition intersecting with at least one second slotted partition, both first and second slotted partitions being made of plastic. The first and second slotted partitions are preferably made from the same identical plastic material. The intersecting first and second slotted partitions form a plurality of holding cells into which different parts are stored for shipment or display.

Each first slotted partition has at least one slot extending inwardly from an edge of the first slotted partition. Likewise each second slotted partition has at least one slot extending inwardly from an edge of the second slotted partition. Preferably the slots are evenly spaced in order to make the holding cells which are defined by the intersecting partitions of identical dimensions. Each of the slots of the first slotted partitions extends inwardly from an edge of the first slotted partition to approximately the midpoint of the first slotted partition. Each of the slots of the second slotted partitions extends inwardly from an edge of the second slotted partition to approximately the midpoint of the second slotted partition.

The plastic partitions may be formed of a solid polyethylene or polypropylene plastic material. Alternatively the partitions may be made of double faced plastic, each slotted partition having two outer face plies of plastic and a plurality of spacers between the face plies. The spacers may be a plurality of dimples pressed from a middle ply of plastic or alternatively the spacers may be a plurality of parallel evenly spaced corrugations, two adjacent corrugations defining a flute. The corrugations and flutes between the face plies of the partitions may be vertically oriented or horizontally oriented. The distance between the two face plies and the distance between the two adjacent corrugations define the size of the flutes.

The first and second slotted partitions are arranged in a matrix. Preferably, the intersecting first and second slotted partitions are made of the same identical plastic material. Each slot of a first slotted partition is engaged with a slot of a second slotted partition at an intersection. The partition matrix is held together in an assembled relation by a plurality of parent weldments of the same identical plastic material as the slotted partitions. For purposes of this application, the term "parent weld" or "parent weldment" refers to a weldment of two contacting plastic parts or partitions welded or secured together without the use of any additional material other than the material of the parts or partitions themselves. In this application, each parent weldment is formed by heating portions of intersecting partitions with a heat source. The heat source is placed in such proximity to the contacting portions of the partitions so that heat from the heat source causes the portions of the partitions to become molten. The heat source is then distanced from the contacting and molten portions of the partitions and the portions of the partitions allowed to cool, thereby creating a parent weld at one or more intersections. The parent welds permanently secure the first slotted partitions to the second slotted partitions at the intersections by fusing the intersecting partitions together. Parent welds may exist at all intersections of the first and second slotted partitions along one edge of the matrix or alternatively only at select intersections depending on the type of heat source used.

Such a process of welding intersecting partitions together without the use of any additional material other than the partitions themselves to form a nondisassembling partition is quick, economical and allows many assemblies to be mass produced with low material and labor costs. Once the portions of the partitions are separated from the heat source and allowed to cool, the parent welds formed thereby exist only at one edge of the matrix and preferably allow the matrix to be collapsible yet nondisassemblable. The capability of the matrix to collapse allows the matrix to be easily collapsed for shipment and then re-erected for reuse.

In order for the first slotted partitions to strongly bond with intersecting second slotted partitions along one edge of the matrix, the first and second slotted partitions preferably are of the same plastic material. If the first and second slotted partitions are not the same identical plastic material a secure weld may be difficult to create by heating and cooling one edge of the matrix and the partition assembly may not be easily recyclable after its useful life is expended.

An alternative embodiment of the present invention includes a supporting net made of plastic attached to one edge of the partition assembly. This alternative embodiment may be formed one of two ways. The first method of forming a nondisassembling partition assembly having a supporting net secured to one edge of the assembly comprises intersecting a plurality of first slotted partitions with a plurality of second slotted partitions at a plurality of intersections thus creating a partition matrix. One edge of the partition matrix is placed proximate a heat source until the edge of the partitions become molten. The heat source is then distanced from the edge of the matrix and a supporting net made of plastic placed against the molten edge of the matrix. The latent heat retained by the molten edge of the matrix melts the supporting net to the matrix and once allowed to cool the supporting net is permanently secured to the edge of the matrix. The supporting net may be made of any plastic material and if sufficiently flexible will allow the matrix to collapse without interfering with the collapsibility of the matrix. The capability of the matrix to collapse enables the assembly to be shipped or stored in a semi-flat condition and be reused when reerected.

An alternative method of forming a nondisassembling partition assembly having a supporting net attached thereto comprises first placing the supporting net proximate a heat source and allowing the supporting net to warm until it is in a semi-molten state. One edge of the partition matrix is then placed on the supporting net while the supporting net is still proximate the heat source. The heat given off by the heat source partially melts the edge of the partitions abutting the supporting net and partially melts the supporting net until both the supporting net and abutting edge of the matrix partitions are in a semi-molten state. The heat source is then separated from the matrix which is now partially melted to the supporting net. Once allowed to cool, the supporting net is permanently attached to one edge of the partition matrix and the intersecting partitions fused together so as to make the assembly nondisassembling.

The supporting net acts as a bottom support or base, enabling items placed in the individual holding cells of the assembly to rest upon and be supported by the net and to be lifted out of the container housing the nondisassembling partition assembly simultaneously with the removal of the nondisassembling partition assembly.

This method of securing a supporting net to a partition assembly is quick, easy and inexpensive. The intersecting first and second slotted partitions are permanently secured to each other along one edge, making the assembly nondisassembling and also enhanced by a supporting net permanently attached to one edge of the partition assembly without using any additional material or tools. dr

DETAILED DESCRIPTION OF THE PREFERRED EMBODIMENT

Figure 1:
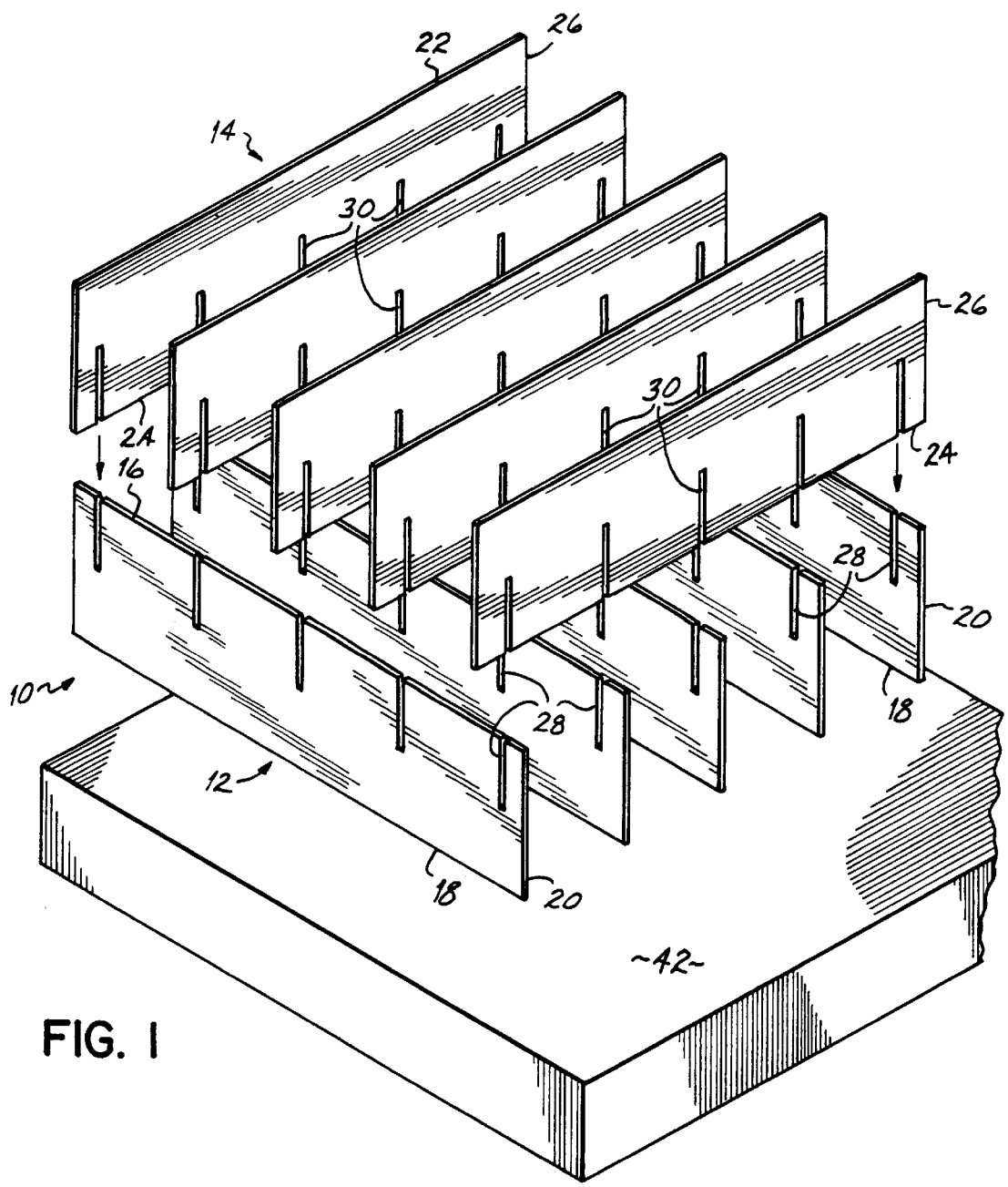
FIG. 1 is a perspective view of a plurality of first slotted partitions and a plurality of second slotted partitions before their engagement with each other to form a partition assembly and before the assembly is placed on a heated surface.

Referring to the drawings and particularly to FIG. 1, there is illustrated in disassembled form a nondisassembling partition assembly of the present invention for dividing the space inside a container. The partition assembly 10 comprises a plurality of parallel first slotted partitions 12 intersecting with a plurality of parallel second slotted partitions 14.

Each first slotted partition 12 has a planar top edge 16, a planar bottom edge 18 and two opposed side edges 20. Likewise each second slotted partition 14 has a planar top edge 22, a planar bottom edge 24 and two opposed side edges 26.

Each first slotted partition 12 has at least one slot 28 which extends downwardly from the top edge 16 of the first slotted partition 12 to approximately the midpoint of the first slotted partition 12. The slots 28 may be evenly spaced apart in order that the individual holding cells of the partition assembly may be evenly sized. Alternatively, the slots 28 of the first slotted partitions 12 may be unevenly spaced in order to form holding cells of the partition assembly of differing sizes to accept different sized parts. The slots 28 are shown as being vertical but may be horizontal if the partition assembly 10 is placed on edge.

Each second slotted partition 14 has at least one slot 30 extending upwardly from the bottom edge 24 of the second slotted partition 14 to approximately the midpoint of the second slotted partition 14. The slots 30 of the second slotted partitions 14 may also be evenly spaced in order so that the holding cells of the partition assembly may be evenly sized. Alternatively, the slots 30 may be unevenly spaced in order to form holding cells of the partition assembly of differing sizes adapted to accept different sized parts. The slots 30 are shown as being vertical but may be horizontal if the partition assembly 10 is placed on edge.

Figure 2A:
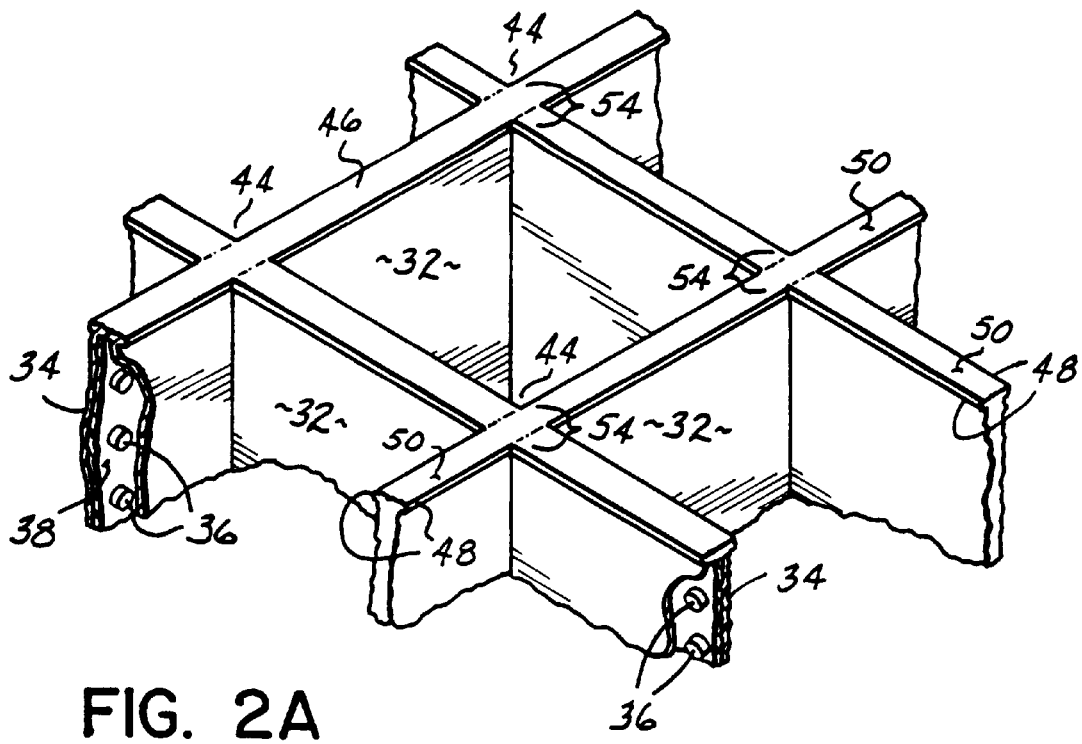
FIG. 2A is an enlarged perspective view of a portion of the partition assembly of FIG. 1 after the assembly has been heated by a heated surface and made nondisassembling, the partitions having a dimpled plastic ply between two face plies.
Figure 2B:
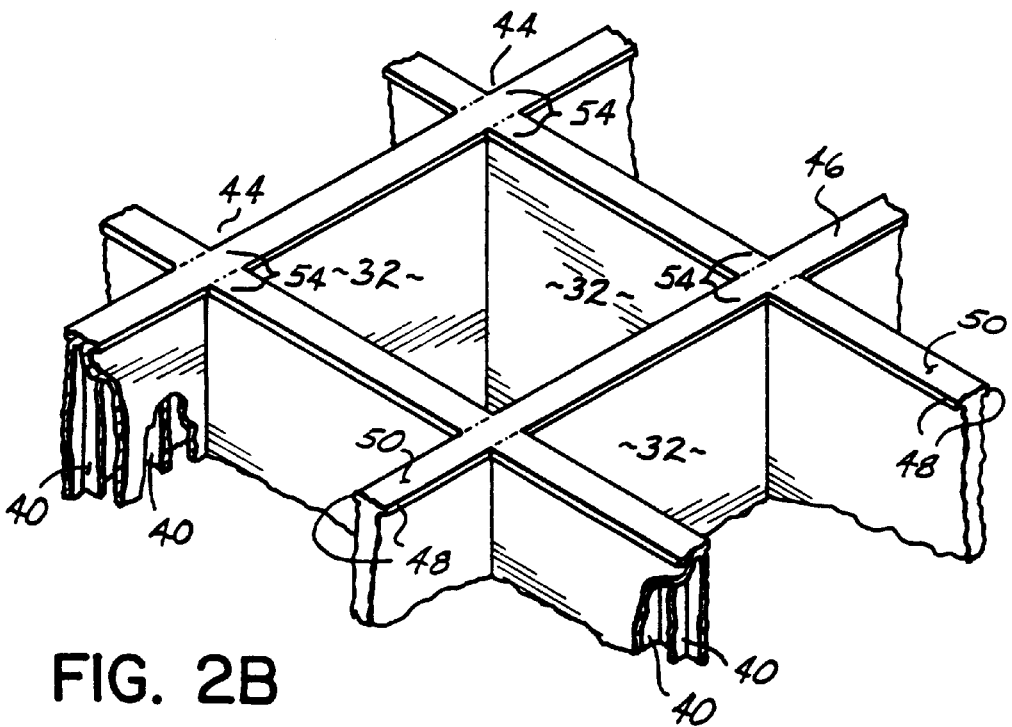
FIG. 2B is an enlarged perspective view of a portion of the partition assembly of FIG. 1 after the assembly has been heated by a heated surface and made nondisassembling, the partitions having vertically oriented corrugations.

Each of the first and second slotted partitions 12, 14 are made of plastic and are preferably made of the same identical plastic. The partitions may be made of solid plastic or of double faced plastic having a plurality of spacers between the two faces. The spacers may be a plurality of dimples punched out of a middle ply of plastic or a plurality of corrugations. The corrugations may be vertically or horizontally oriented. As best illustrated in FIGS. 2A and 2B, each slotted partition may have two face plies 32 and 34 which are parallel to one another. Between the face plies 32, 34 are a plurality of spacers. As illustrated in FIG. 2A, the spacers may be a plurality of dimples 36 protruding from a middle ply of plastic 38. Alternatively the spacers may be a plurality of evenly spaced corrugations 40 between the face plies 32 and 34. The corrugations may be vertically or horizontally oriented. FIG. 2B illustrates vertically oriented corrugations 40 between the face plies 32 and 34 of each of the partitions. The spacers may be any other configuration as long as they separate the two face plies 32, 34.

Although the partitions of the assembly may be solid plastic or double faced plastic with a plurality of spacers therebetween, usually each assembly is made up of first and second partitions of identical material. In other words, all of the first slotted partitions and all of the second slotted partitions of one matrix or assembly 10 are preferably of identical material in accordance with the practice of this invention. For example, in FIG. 2A the first and second slotted partitions are both made of double faced plastic having a plurality of dimples 36 between the face plies 32 and 34. However, the intersecting first and second slotted partitions may be different. For example, the first slotted partitions may have dimples 36 between two face plies and the second slotted partitions have vertically oriented corrugations 40 between the face plies.

To practice the method of this invention and form a nondisassembling partition assembly, a plurality of first slotted plastic partitions 12 are arranged on edge in a spaced parallel manner. As illustrated in FIG. 1, slots 28 of the first slotted partitions 12 extend inwardly from the top edge of the first slotted partitions with a bottom edge of the first slotted partitions abutting the planar heated surface 42. A plurality of second slotted partitions 14 are lowered downwardly in an interlocking arrangement with the first slotted partitions 12 to form a partition matrix. As illustrated in FIG. 1, the slots 30 of the second slotted partitions 14 extend upwardly from the lower edge of each of the second slotted partitions 14. Each slot 28 of a first slotted partition 12 engages with a slot 30 of a second slotted partition 14 at an intersection 44. The second slotted partitions 14 are lowered downwardly in locking engagement with the first slotted partitions 12 until the bottom edge 24 of the second slotted partitions is co-planar with the bottom edge 18 of the first slotted partitions.

Once the matrix is completely assembled by engaging the slots of the partitions, the matrix is lowered downwardly until it rests on the heated surface 42. One of the edges of the matrix, usually the bottom edge 46 of the matrix abuts the heated planar surface 42 and rests thereon. The bottom edge of the matrix 46 remains on the planar heated surface for a sufficient length of time until the lower edges 18, 24 of the partitions become molten. The heat melts the plastic of the partitions. Once the bottom edge 46 of the matrix is in a molten state the heated planar surface 42 is removed from the matrix, usually by lifting the matrix away from the heated surface. The edge of the matrix 46 is then allowed to cool creating a parent weld at each intersection permanently securing intersecting partitions in a nondisassembling relationship. The parent weld is formed without the use of any additional material other than the material of the partitions themselves.

As best seen in FIGS. 2A and 2B the edges of the matrix partitions which have been heated, after cooling, generally have a ridge 48 extending laterally from the faces of the partitions. Thus, a cross-section of the first and second slotted partitions are in the form of a "T" with a horizontal planar edge 50 formed as the result of the heating of the edges of the partition against the heated planar surface. Along the lengths of all the partitions which were against the heated planar surface 42 is the planar flat edge 50 having two outwardly extending ridges 48 which extend outwardly from the sidewalls 32, 34 of the first and second slotted partitions.

Preferably the first and second slotted partitions are made of the same identical plastic material in order that the parent welds 54 formed as a result of placing the edge 46 of the matrix against the heated planar surface are solid and strong and the complete assembly may be easily recycled after the useful life of the assembly is expended. However, the first and second slotted partitions may be made of different plastic materials. A weld formed at an intersection of a first slotted partition 12 and a second slotted partition 14 of differing plastic compositions will generally not be as strong as a weld formed between a first and second slotted partition of the same identical plastic material.

Figure 3:
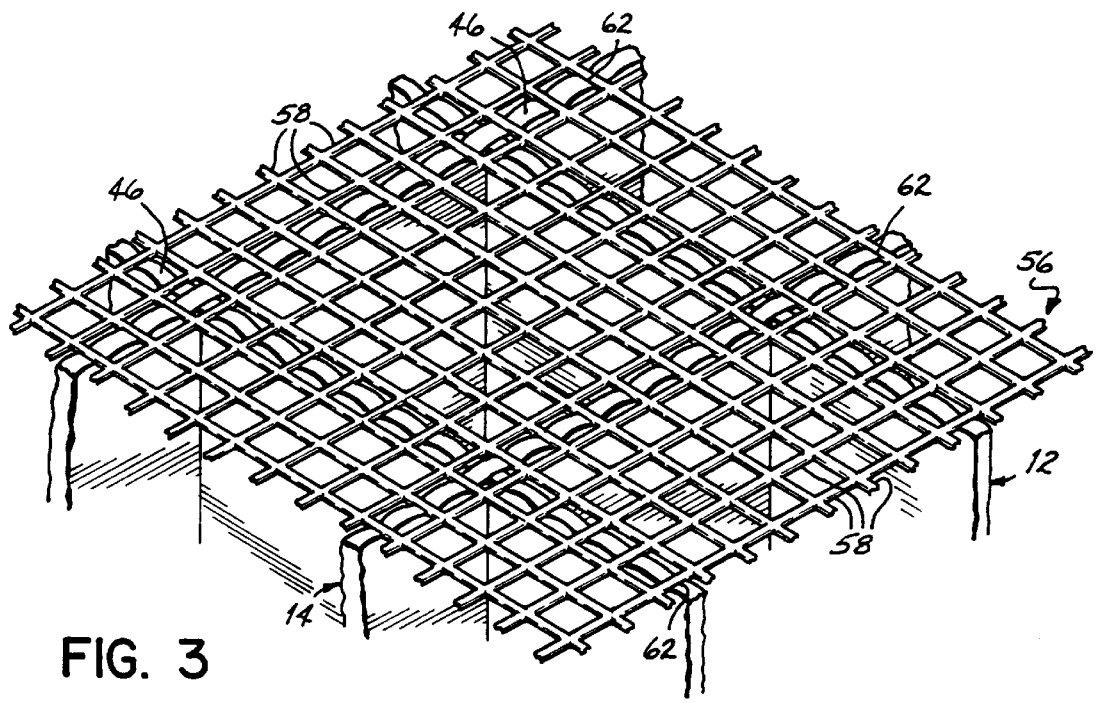
FIG. 3 is a perspective view of an alternative embodiment of the present invention having a supporting net secured to one edge of the partition assembly.

An alternative embodiment of the present invention is illustrated in FIG. 3 which includes a supporting net 56. The supporting net 56 is attached to one edge of the partition assembly while the heated edge 46 of the matrix is still in a molten state. The supporting net 56 becomes permanently attached to the edge of the matrix 46 when the edge of the matrix 46 is allowed to cool once separated from the heating surface 42.

The supporting net 56 itself consists of crisscrossing individual net members 58 which are made of plastic, preferably of the same composition as the composition of the partitions in order to aid in the recyclability of the partition assembly 10 as a whole. The net material is preferably polyethylene or polypropylene but may be any other flexible net material.

Figure 4:
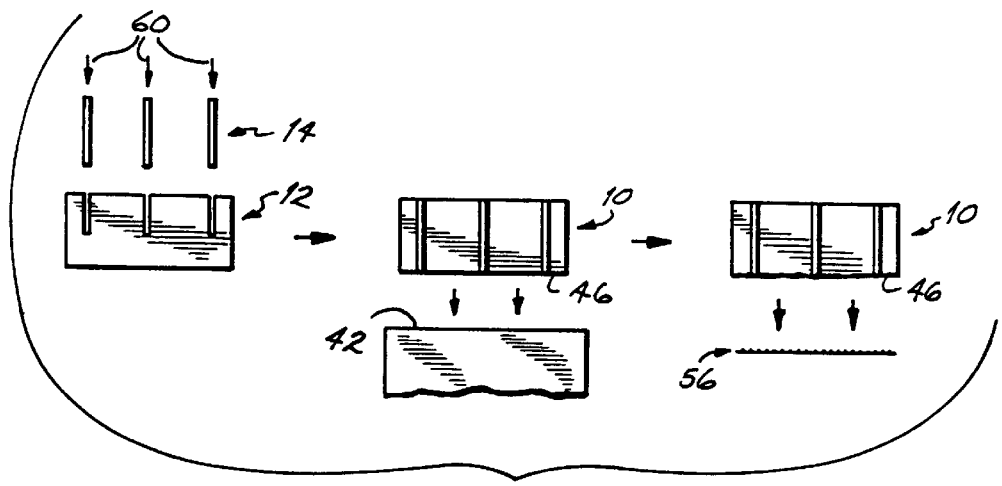
FIG. 4 is a series of diagrammatic side elevational views illustrating a method of manufacturing the nondisassembling partition assembly using a hot planar surface.

As illustrated in FIG. 4, the method by which this alternative embodiment of a nondisassembling partition assembly with a securing net is manufactured is similar to the method of manufacturing the nondisassembling partition assembly without the net. A plurality of first slotted partitions 12 are lined up in a spaced parallel manner with their slots 28 extending downwardly from the top edge thereof. A plurality of second slotted partitions 14 are moved downwardly as shown by the arrows 60 in FIG. 4 until the slots of the second slotted partitions engage the slots of the first slotted partitions at a plurality of intersections. The partitions thus form a matrix or assembly which at this point may still be disassembled.

The partition matrix is then lowered downwardly onto a hot plate or heated surface 42 so that one edge of the matrix abuts the surface 42 of a hot plate. Heat from the hot plate melts the one edge 46 of the matrix partitions to a molten state. Then the matrix as a whole is removed from the heated surface 42 of the hot plate and placed downwardly on top of a supporting net 56 so that the heated edge of the matrix 46 abuts the top surface of the supporting net 56. Retained heat of the molten edge 46 of the matrix partially melts the individual members 58 of the supporting net 56. The net and matrix are then allowed to cool, thereby permanently securing the first and second intersecting partitions and permanently securing the supporting net 56 to the edge 46 of the matrix. The supporting net 56 is thereby permanently attached to the bottom edge of the partition assembly 10 and forms a bottom or base for the complete assembly. This configuration of partition assembly with a net bottom enables individual articles placed inside the holding cells of the partition assembly 10 to be lifted out of the box or container with the partition assembly 10 when the partition assembly 10 is lifted out of a box or container. Depending on the material of the supporting net the partition assembly 10 may or may not be collapsible.

An alternative method of constructing a nondisassembling partition assembly having a supporting net attached thereto involves a slight modification of the above-described method. Using this method of assembly the intersecting first and second slotted partitions are engaged with one another to create a matrix just as in the above-described method. However, rather than the lower edge of the matrix being placed directly onto the heated surface 42 of the hot plate, the supporting net 56 is placed directly onto the hot plate before the matrix is placed on the hot plate. The supporting net 56 is laid onto the hot plate and allowed to become soft and partially molten. The matrix of partitions is then placed on top of the supporting net which is still on top of the hot plate. The bottom edge 46 of the matrix abuts in face to face relation the top surface of the supporting net 56 and heat from the hot plate partially melts the lower edge of the matrix partitions and the supporting net 56. Once the supporting net and lower edge of the intersecting partitions are sufficiently heated and molten, the matrix and supporting net are lifted away from the hot plate 10 with the supporting net 56 attached to the lower edge 46 of the matrix. The net and matrix are then allowed to cool sufficiently to create a plurality of welds at the intersections securing the first and second slotted partitions together in a nondisassembling fashion and also creating permanent welds between the individual members 58 of the supporting net 56 and the lower edges of the partitions at a plurality of locations where net members 58 cross the partitions. These welds can be seen in FIG. 3 and are numbered 62.

Figure 5:
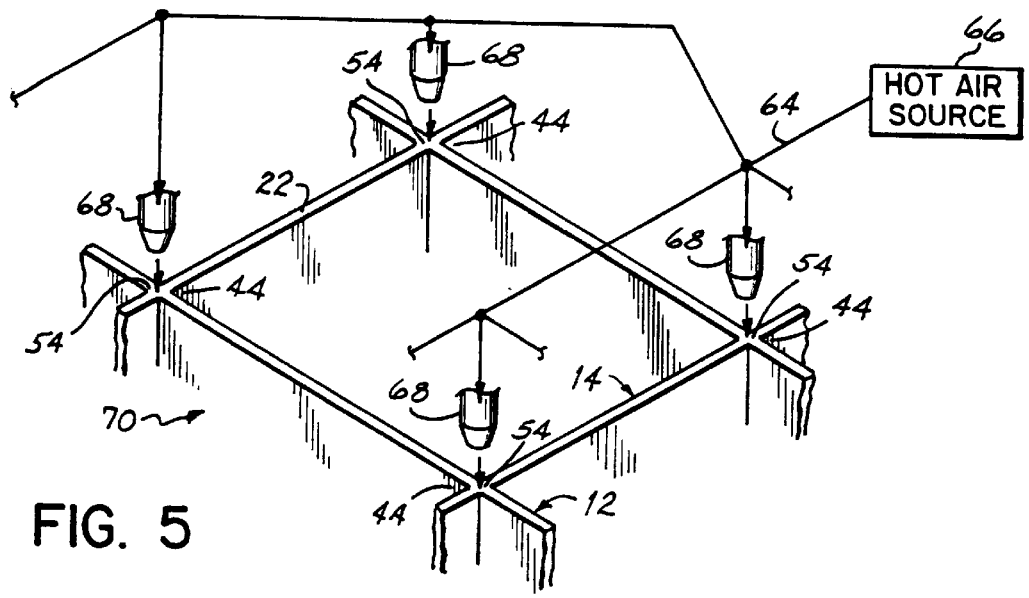
FIG. 5 is a perspective view of a plurality of hot air nozzles placed directly above a plurality of intersections to heat intersecting partitions.

An alternative method of constructing the present invention utilizing a different heat source is illustrated in FIG. 5. Using this method, intersecting partitions are secured together with parent welds created by hot air being blown through one or more nozzles 68. A plurality of hot air lines 64 connect a hot air source 66 to a plurality of nozzles 68 which lie directly above one or more intersections 44 of the partitions 12, 14. Hot air is blown through each nozzle 68 downwardly on to the top edges 22 of the partitions at the intersections 44 in order to heat the plastic of the partitions until the top edges of the partitions become molten and the plastic of the intersecting partitions flows together. Once molten, the nozzles 68 either one at a time or simultaneously are distanced from the intersections 44 or the hot air is cut off in order to prevent further heating of the intersections. The molten plastic at the intersections 44 is then allowed to cool creating a parent weld (not shown) at each of the intersections. The parent welds permanently secure the first and second partitions 12, 14 to each other. Utilizing this method of manufacture not all intersections need be heated in order to create a non-disassembling matrix. A parent weld may be created at select intersections only by placing a nozzle 68 above selected intersections 44 of the matrix, such as for example at the four corner intersections 44 of the matrix. One or more nozzles 68 may be moved relative to the matrix 70 or alternatively the matrix 70 may be moved relative to stationary nozzles 68.

Figure 6:
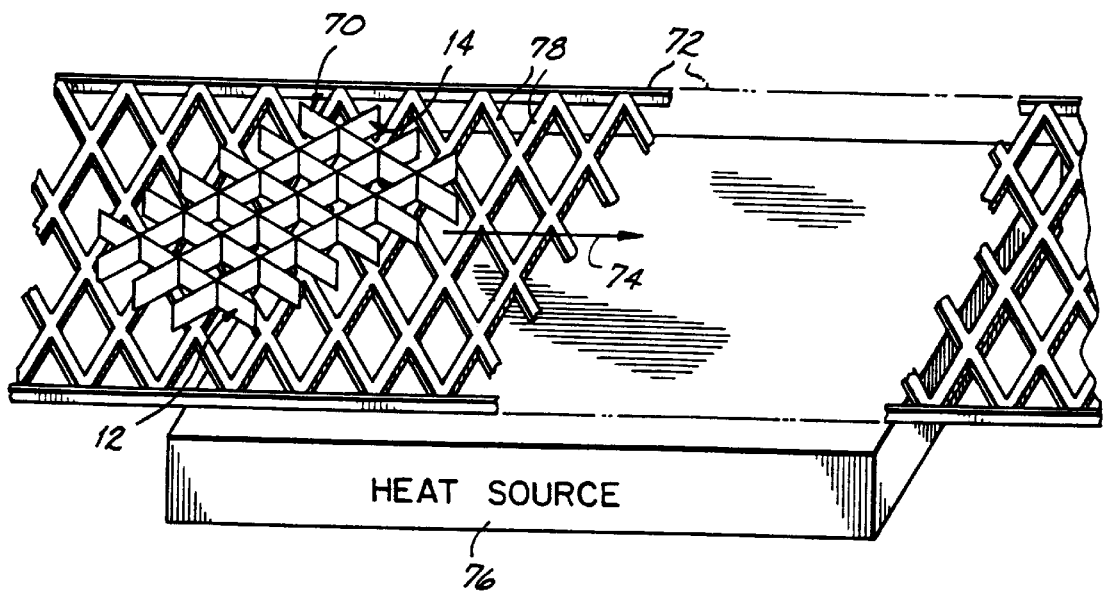
FIG. 6 is a perspective view of a partition matrix supported by a conveyor belt with the conveyor belt passing over a heat source in order to heat one edge of the partition matrix.

FIG. 6 illustrates another method used to secure intersecting partitions to each other with parent welds. Employing this method all intersections 44 of a matrix are bound together with parent welds rather than only select intersections being parent welded. One entire edge of a matrix is heated rather than select intersections. Rather than an edge of a matrix 70 directly touching a heat source or hot plate, the matrix 70 is supported on a conveyor belt 72 which passes in the direction of arrow 74 allowing the matrix 70 to pass above a heat source 76. The conveyor belt 72 is made up of a crisscrossing members, such as metal mesh 78 allowing heat from the heat source 76 to penetrate through the conveyor belt 72 and heat the lowermost edge of the matrix 70. This lower edge of the matrix (most proximate the heat source) is heated until the edges of the individual partitions become molten. As the conveyor belt moves the matrix 70 along in the direction of arrow 74, the matrix 70 is distanced from the heat source 76 and the edge of the matrix which had been molten when the matrix was directly above the heat source is now allowed to cool, creating a plurality of parent welds 54 at each of the intersections 44 of partitions 12, 14. The heat source 76 may be any source of sufficient heat, including but not limited to hot air, a radiant hew, or heat from a hot plate. Utilizing this method of manufacture, many partition assemblies may be made nondisassembling quickly, easily, and at a low cost without utilizing any additional material other than the material of the partitions themselves.

While I have described only a few embodiments of my invention, I do not intend to be limited except by the scope of the following claims:

What is claimed is:

1. A method of forming a nondisassembling intersecting partition matrix with a supporting net, said matrix comprising at least one first slotted partition intersecting with at least one second slotted partition, each first slotted partition having at least one slot extending inwardly from an edge of the first slotted partition, each second slotted partition having at least one slot extending inwardly from an edge of the second slotted partition, said method comprising the steps of:

engaging said at least one slot of said at least one first slotted partition with said at least one slot of said at least one second slotted partition at an intersection to form a matrix;

heating an edge of said matrix, placing a supporting net in contact with said edge of said matrix, allowing said matrix and supporting net to cool to secure the matrix and the supporting net to each other.

2. The method of forming a nondisassembling intersecting partition matrix with a supporting net of claim 1 wherein said partitions of said matrix are heated until molten before the supporting net is secured to the matrix.

3. A method of forming a nondisassembling intersecting partition matrix, said matrix comprising a plurality of first slotted partitions intersecting with a plurality of second slotted partitions, each first slotted partition having a series of slots, each slot extending inwardly from an edge of the first slotted partition, each second slotted partition having a series of slots each slot extending inwardly from an edge of the second slotted partition, said method comprising the steps of:

engaging the slots of the first plurality of slotted partitions with slots of the second plurality of slotted partitions at intersections to form a matrix;

heating an edge of said matrix with a heat source partially melting said edge of said matrix, placing a supporting net on said edge of said matrix, allowing said edge of said matrix to cool to create welds permanently securing the intersecting partitions in a nondisassembling relationship and securing said supporting net to the intersecting partitions.

4. The method of forming a nondisassembling intersecting partition matrix of claim 3 wherein said supporting net is placed on said edge of said matrix while said edge is molten.

5. The method of forming a nondisassembling intersecting partition matrix of claim 3 wherein said partitions and said supporting net are of the same generally plastic composition for ease of recyclability.

6. A method of forming a nondisassembling partition matrix, said matrix comprising a plurality of first slotted partitions intersecting with a plurality of second slotted partitions, each first slotted partition having a series of slots, each slot extending from an edge of the first slotted partition towards an opposite edge of said first slotted partition, each second slotted partition having a series of slots, each slot extending from an edge of the second slotted partition towards an opposite edge of the second slotted partition, said method comprising the steps of:

engaging a slot of a first slotted partition with a slot of a second slotted partition at an intersection to form a matrix, heating a supporting net with a heat source partially melting said supporting net, placing an edge of said matrix against said supporting net, separating said matrix and supporting net from said heat source, allowing said matrix and supporting net to cool to permanently secure the intersecting partitions in a nondisassembling relationship and secure said supporting net to said intersecting partitions.

7. The method of forming a nondisassembling partition matrix of claim 6 wherein said supporting net is proximate said heat source when said edge of said matrix is placed against the supporting net.

8. A method of forming a nondisassembling partition assembly having a supporting net secured to a partition matrix, said partition matrix comprising a plurality of first slotted partitions intersecting with a plurality of second slotted partitions, each first slotted partition having a series of slots extending inwardly from an edge of the first slotted partition, each second slotted partition having a series of slots extending inwardly from an edge of the second slotted partition, said method comprising the steps of:

engaging one of the slots of the first slotted partition with one of the slots of the second slotted partition at an intersection to form a matrix;

heating an edge of the matrix with a heat source to partially melt coplanar edges of said partitions, placing said edge of the matrix against the supporting net, allowing said partitions to cool, thereby permanently securing the supporting net and matrix in a nondisassembling relationship.

9. The method of forming the nondisassembling partition assembly of claim 8 wherein heating said edge of the matrix comprises placing said edge on a heat source.

10. A method of forming a nondisassembling partition assembly having a supporting net secured to a partition matrix, said partition matrix comprising a plurality of first slotted partitions intersecting with a plurality of second slotted partitions, each first slotted partition having a series of slots extending inwardly from an edge of the first slotted partition, each second slotted partition having a series of slots extending inwardly from an edge of the second slotted partition, said method comprising the steps of:

engaging one of the slots of the first slotted partition with one of the slots of the second slotted partition at an intersection to form a matrix;

placing the supporting net directly on a heat source in order to partially melt said supporting net, placing the matrix on the supporting net, lifting said matrix with said supporting net attached to said matrix away from said heat source and allowing said matrix and supporting net to cool, thereby permanently securing the supporting net and matrix together.

11. The method of forming the nondisassembling partition assembly of claim 10 wherein the supporting net is on the heat source when the matrix is placed on the supporting net.

12. A method of forming a partition assembly having a bottom, said method comprising:

heating an edge of said partition assembly, contacting said edge of said partition assembly with a supporting net, allowing said edge of said partition assembly and said supporting net to cool to secure the edge of said partition assembly and said supporting net together.

13. The method of claim 12 wherein said heating said edge of said partition assembly comprises placing coplanar edges of partitions on a heated surface to partially melt said coplanar edges of said partitions.

14. A method of forming a nondisassembling intersecting partition matrix with a supporting net, said matrix comprising at least one first slotted partition intersecting with at least one second slotted partition, each first slotted partition having at least one slot extending inwardly from an edge of the first slotted partition, each second slotted partition having at least one slot extending inwardly from an edge of the second slotted partition, said method comprising the steps of:

engaging said at least one slot of said at least one first slotted partition with said at least one slot of said at least one second slotted partition at an intersection to form a matrix;

heating one of said matrix and said supporting net, placing a supporting net in contact with said matrix, allowing said matrix and supporting net to cool to secure the matrix and the supporting net to each other.

* * * * *